US012673777B2

(12) United States Patent　　　　　(10) Patent No.:　US 12,673,777 B2
　　Chylinski et al.　　　　　　　　　　(45) Date of Patent:　　　Jul. 7, 2026

(54) AIRCRAFT CHILLING SYSTEM ARCHITECTURE

(71) Applicant: B/E AEROSPACE (UK) LIMITED, Leighton Buzzard (GB)

(72) Inventors: Rafal Hubert Chylinski, Bristol (GB); Boryan A. Kashikov, Leighton Buzzard (GB); Nikita Undricov, Milton Keynes (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 133 days.

(21) Appl. No.: 18/391,078

(22) Filed: Dec. 20, 2023

(65) Prior Publication Data

US 2024/0239495 A1　　Jul. 18, 2024

(30) Foreign Application Priority Data

Jan. 13, 2023　(EP) ..................................... 23275009

(51) Int. Cl.
　　B64D 11/04　　　　(2006.01)
　　B64D 13/08　　　　(2006.01)
(52) U.S. Cl.
　　CPC .............. B64D 13/08 (2013.01); B64D 11/04 (2013.01)
(58) Field of Classification Search
　　CPC ................................ B64D 13/05; B64D 11/04
　　USPC ........................................................... 62/172
　　See application file for complete search history.

(56) References Cited

U.S. PATENT DOCUMENTS

| | | |
|---|---|---|
| 10,021,970 B2 | 7/2018 | Lu et al. |
| 10,287,017 B2 | 5/2019 | Moran et al. |
| 10,492,603 B2 | 12/2019 | Garcia et al. |
| 10,638,834 B2 | 5/2020 | Holtorf et al. |
| 11,306,958 B2 | 4/2022 | Moran |
| 2005/0210910 A1* | 9/2005 | Rigney .............. B60H 1/00014 62/506 |
| 2012/0285335 A1* | 11/2012 | Cunningham ......... B64D 11/04 99/323.1 |

(Continued)

FOREIGN PATENT DOCUMENTS

WO　　　2013149143　　　10/2013

OTHER PUBLICATIONS

European Patent Office; European Search Report dated Jun. 26, 2023 in Application No. 23275009.1.

(Continued)

*Primary Examiner* — Nael N Babaa
(74) *Attorney, Agent, or Firm* — SNELL & WILMER L.L.P.

(57)　　　　　ABSTRACT

A chiller assembly for a galley having one or more rectangular galley compartments defined by a back wall, a floor, a top wall and two opposing side walls, the chiller assembly comprising a chiller system comprising a heat exchanger configured to be located in use in a space adjacent a side wall of a compartment external to the compartment, and a blower duct connected to receive chilled air from the heat exchanger, the blower duct arranged to extend adjacent the top wall or the floor of the compartment, the blower duct having vents to blow chilled air into the compartment via the top wall or the floor, the chiller system further comprising a return duct arranged adjacent the other of the floor or the top wall of the compartment to suck air from the compartment and return it to the heat exchanger.

13 Claims, 4 Drawing Sheets

FRONT VIEW

(56)  References Cited

U.S. PATENT DOCUMENTS

| | | |
|---|---|---|
| 2015/0266353 A1 | 9/2015 | Lu et al. |
| 2016/0338488 A1 | 11/2016 | Garcia et al. |
| 2017/0101185 A1 | 4/2017 | Truemper |
| 2019/0144118 A1 | 5/2019 | Truemper et al. |

OTHER PUBLICATIONS

European Patent Office, European Office Action dated Mar. 7, 2025 in Application No. 23275009.1.

* cited by examiner

FRONT VIEW

FRONT VIEW

AIRCRAFT CHILLING SYSTEM ARCHITECTURE

CROSS-REFERENCE TO RELATED APPLICATIONS

This application claims priority to, and the benefit of, EP Patent Application No. 23275009.1, filed Jan. 13, 2023, and titled "AIRCRAFT CHILLING SYSTEM ARCHITEC-TURE," which is incorporated by reference herein in its entirety for all purposes.

FIELD

The present disclosure relates to chilling systems for galleys in aircraft.

BACKGROUND

Aircraft typically include one or more galleys to store food and beverages on the aircraft. Food and beverages are typically stored in galley carts that are stowed in galley compartments and can be removed by the crew to provide the passenger service. Galleys may be located at different locations in the aircraft e.g. in the area between the cockpit and the first row or passenger seats, at the back of the aircraft behind the last row of passenger seats or, for large aircraft, at various locations between aisles/rows of seats. Many food and beverage items have to be maintained at a suitable temperature and, particularly on long flights, refrigeration systems are required in the galleys to ensure that the food and beverages are stored at the required cooled temperature.

Passenger aircraft commonly use one of two types of refrigeration system. One system uses an air chiller that utilizes refrigerant vapor compression and expansion tech-nology to generate a secondary re-circulated chilled air loop. The chilled air is supplied to the galley compartments and returned from the compartment to the chiller via thermally insulated air ducting. A second type of system uses similar technology but provides a coolant liquid rather than air as the cooling medium. Conventionally, the heat exchanger and ducting for such refrigeration systems is located at the back of the galley behind the carts.

The galley has to be sized to be deeper than the depth of the carts to accommodate the refrigeration system. One drawback to such refrigeration systems, therefore, is that they take up a relatively large space in the galley. Available space and weight are restricted in aircraft and there is, therefore, a desire to provide a galley chilling system architecture that takes up less galley space whilst continue to satisfy the requirements of a refrigeration system.

SUMMARY

According to the disclosure, there is provided an aircraft galley chilling system architecture in which the chiller/heat exchanger is arranged to be housed in a space at the side and/or above galley compartments and is connected to means for blowing cooled air or fluid into the top or bottom of the compartment and for drawing return air from the top or bottom of the compartment.

The disclosure provides a chiller assembly for a galley having one or more rectangular galley compartments defined by a back wall, a floor, a top wall and two opposing side walls, the chiller assembly comprising a chiller system comprising a heat exchanger configured to be located in use in a space adjacent a side wall of a compartment external to the compartment, and a blower duct connected to receive chilled air from the heat exchanger, the blower duct arranged to extend adjacent the top wall or the floor of the compart-ment, the blower duct having vents to blow chilled air into the compartment via the top wall or the floor, the chiller system further comprising a return duct arranged adjacent the other of the floor or the top wall of the compartment to suck air from the compartment and return it to the heat exchanger.

The blower duct may extend adjacent the top wall and blow air from the top of the compartment and the return duct sucks air from the bottom of the compartment, or, in another design, the blower duct extends adjacent the floor of the compartment and blows air from the bottom of the com-partment and the return duct suck air from the top of the compartment.

The chiller assembly may further comprise a second chiller system comprising a second heat exchanger, a second blower duct and a second return duct.

The second heat exchanger may be configured to be located, in use, adjacent a back wall of a compartment, the second blower duct is configured to extend adjacent a top wall of the compartment and the return duct is configured to extend adjacent the floor of the compartment.

A galley is also provided comprising one or more rect-angular compartments positioned adjacent each other, each compartment defined by a back wall, a floor, a top wall and two opposing side walls, and a chiller assembly as defined above, the heat exchanger located adjacent and external to a side wall of one of the compartments.

The galley may comprise a plurality of lower compart-ments arranged side-by-side and a plurality of upper com-partments arranged above the lower compartments, and a work deck between the lower and the upper compartments. The blower duct may extend along the work deck.

A second chiller system may be located adjacent the back wall of one of the upper compartments.

The side wall of an end compartment of the one or more compartments may be located adjacent a non-straight inner surface of an aircraft, the space being defined between the side wall and the non-straight inner surface.

BRIEF DESCRIPTION OF THE DRAWINGS

Examples of the galley chilling system architecture will be described with reference to the drawings. It should be noted that these are examples only and variations are pos-sible within the scope of the claims.

DETAILED DESCRIPTION

Figure 1:
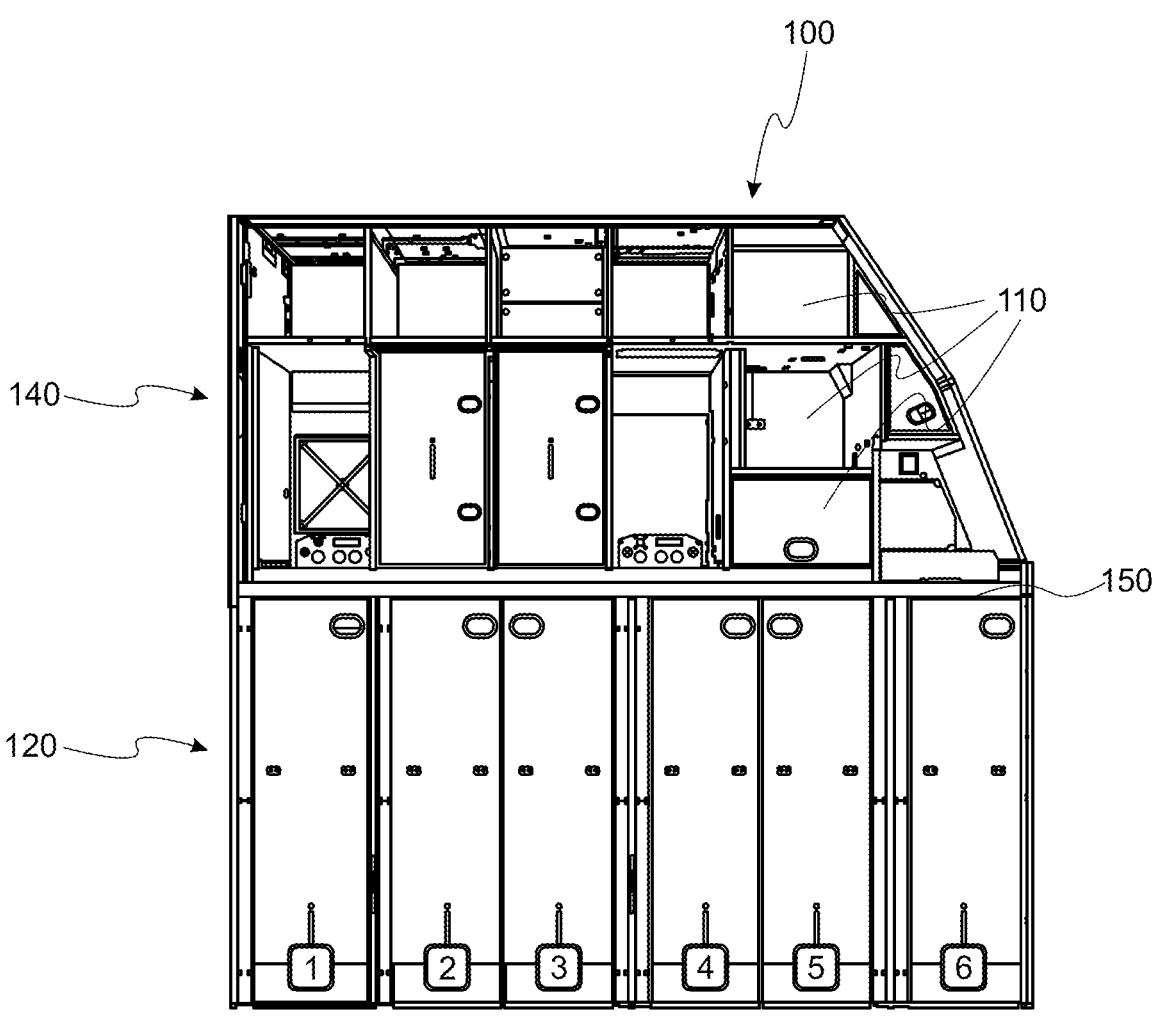
FIG. 1 shows a typical galley design in which the chilling system architecture of the disclosure can be incorporated.

With reference to FIG. 1, a typical aircraft galley 100 will be described. The galley shown in FIG. 1 is of the type that is commonly located just behind the cockpit or at the rear of the aircraft. The galley comprises a lower galley zone 120 having a number of lower galley compartments 10, 20, 30, 40 which are typically rectangular and are shaped to receive one or more galley carts 1, 2, 3, 4, 5, 6 which can be wheeled into and out of the compartment. The food/beverages are stored in the galley trolleys. When the galley carts are stowed in the galley compartments, the galley chilling system (described further below) will keep then food/beverages at a cooled temperature. The crew can then pull the carts out of the compartment and wheel them along the aircraft aisles to provide the food/beverage service to the passengers. When stowed in the galley compartments, the carts are secured by a locking mechanism (not shown or described further here). In smaller aircraft, the galley compartments may be sized to receive a single cart or two half-sized carts. In larger aircraft, the galley compartments may have a depth sufficient to stow two full-sized galley carts or one full-sized cart and one half-sized cart.

Typically, a work deck 150 is provided on top of the lower galley compartments, which provides a work surface for the crew on which they can place items or prepare food/beverages.

The galley may also have an upper galley zone 140 above the work deck 150, which is also divided into a number of upper galley compartments 110. These upper compartments are typically sized and shaped to receive other items required by the crew such as ovens, coffee machines, kettles, and containers for other items some of which also need to be chilled. Because the upper galley compartments are typically at or above head height, the depth of the compartments or at least the depth where the contents are located is less than for the lower galley compartments since crew would usually not be able to reach as far back as the depth of the lower compartments in the upper galley zone 140.

The galley, having rectangular compartments, defines straight outer edges and corners which are fitted within the typically rounded inner surface of the aircraft fuselage. The galley will usually be fitted to minimize the space wasted between the galley compartments and the fuselage space into which the galley is fitted but there will clearly be some wasted space due to the different shapes.

Figure 6B:
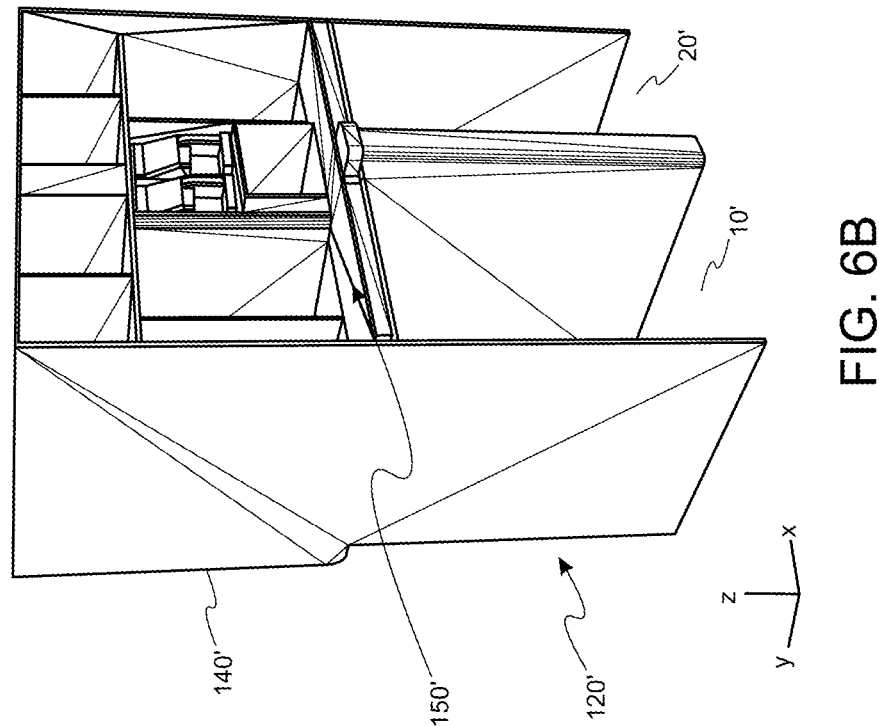
FIG. 6B shows an example of the galley depicted in outline in FIG. 6A.

Other galleys may be provided in the middle of the aircraft. FIG. 6B shows such a centerline galley. As for the galleys described above, such galleys also typically have a lower galley zone 120' divided into compartments 10', 20', an upper galley zone 140', and a work deck 150' between the lower and the upper zones.

Figure 2:
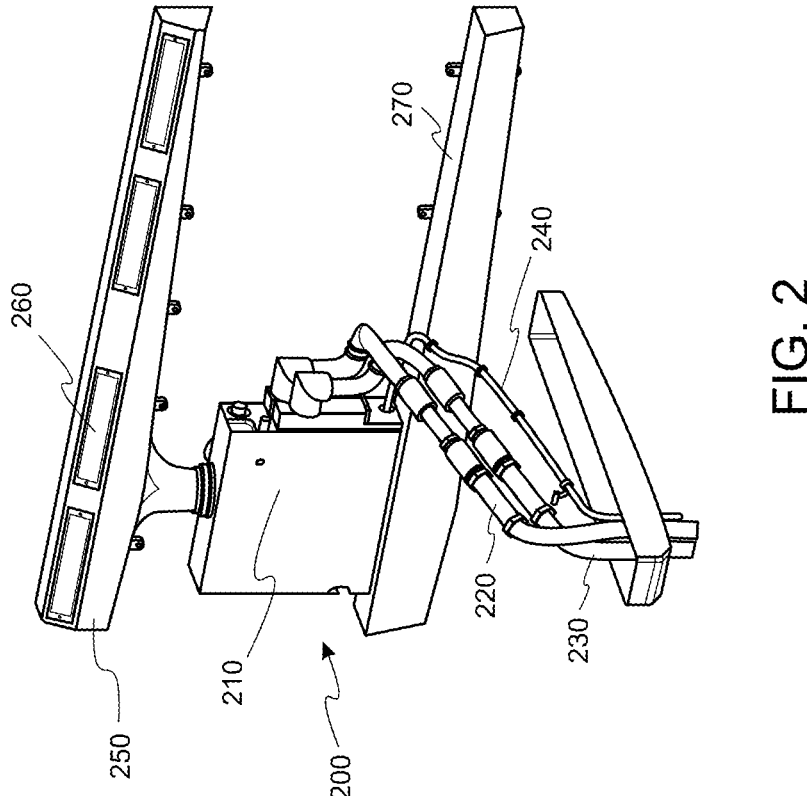
FIG. 2 shows a conventional chilling system.

A conventional chilling system is shown in FIG. 2. The system 200 includes an electrically powered chiller or heat exchanger 210 to which cooling fluid is provided from a supply hose or pipe 220 and from which fluid is returned via a return hose or pipe 230. Electric power is provided from an external power supply (not shown). A drainage pipe 240 may be provided. Cooled air from the chiller 210 is provided to a blower duct 250 which is provided with a number of vents 260 through which cold air is blown out. The cooled air is then sucked back into the chilling system via a return duct 270.

Figure 3:
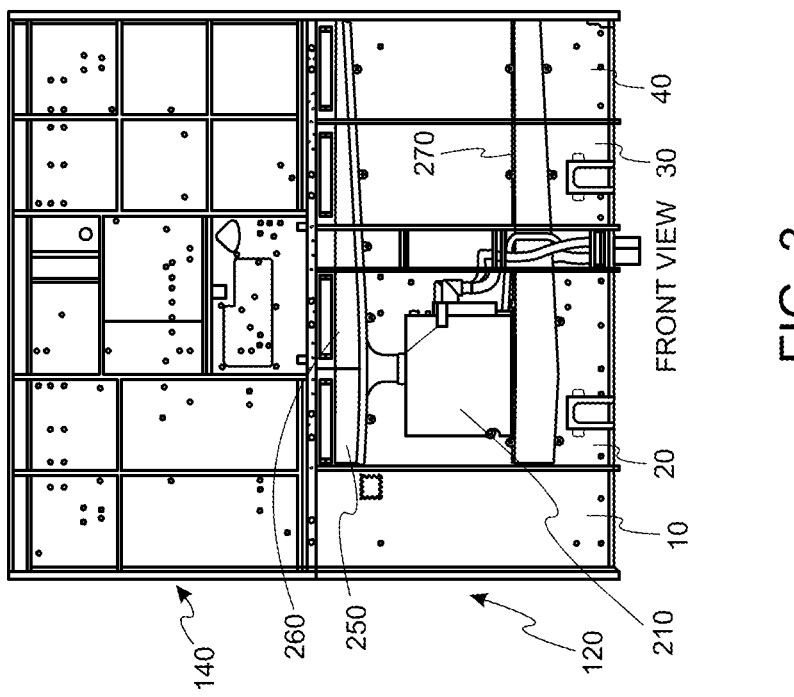
FIG. 3 shows an example of a conventional chilling system such as shown in FIG. 2 as conventionally arranged in an aircraft galley.

As described above and as shown in FIG. 3, which shows a front view of a galley shown in a transparent view, the chilling system 200 which is typically located in the lower galley zone 120 at the back of the lower compartments 20, 30, 40 and is arranged such that the vents 260 blow cooled air from the top of the lower compartments. The air is sucked into the return duct 270 near the bottom of the compartments.

As mentioned above, the location of the chilling system 200 at the back of the compartments takes up additional space in the lower galley zone and so this zone needs to be deeper than just the depth of the galley carts to be stowed therein.

The aim of the present disclosure is to provide a galley chilling system architecture that more efficiently and optimally uses the available space in the aircraft and galley to avoid the need for the chilling system to be located at the rear of the galley compartments. This then enables the depth of the galley to be minimized and to be essentially the same depth as the galley carts to be stowed in the compartments.

Figure 6A:
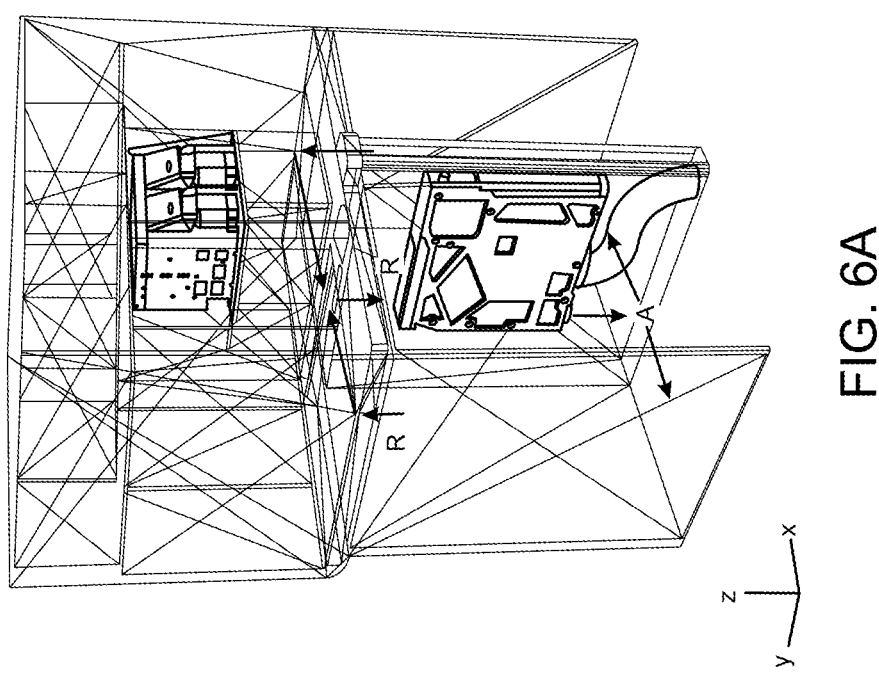
FIG. 6A shows an alternative chilling system architecture according to the disclosure.

In the architecture according to the disclosure, the chiller/heat exchanger 310, 410 is configured to be located in a space at the side of a lower zone galley compartment and/or at the back of an upper zone galley compartment as shown in FIG. 6 and as will be described further below. In this way, the chiller is not located in the galley compartment configured to receive galley carts and, instead, use is made of other available, and currently unused, space to house the chiller(s) 310, 410. Ducting is then provided to route the cooling air and for return of the air to the chilling system.

Figure 5:
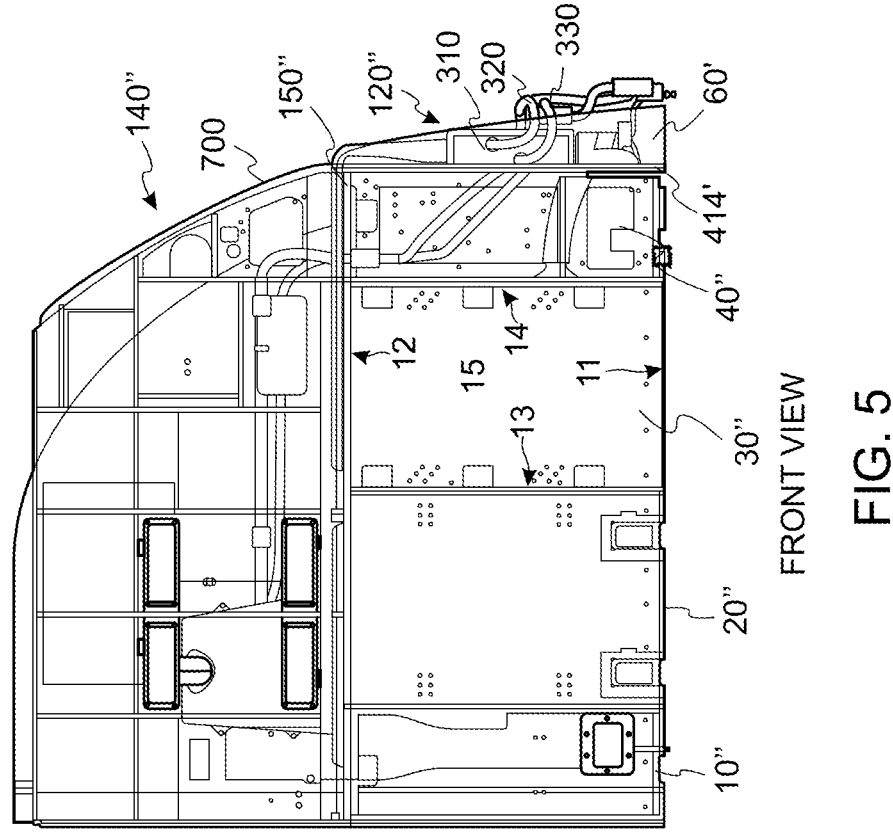
FIG. 5 shows an example of a chilling system such as shown in FIG. 4 as arranged in an aircraft galley.
Figure 4:
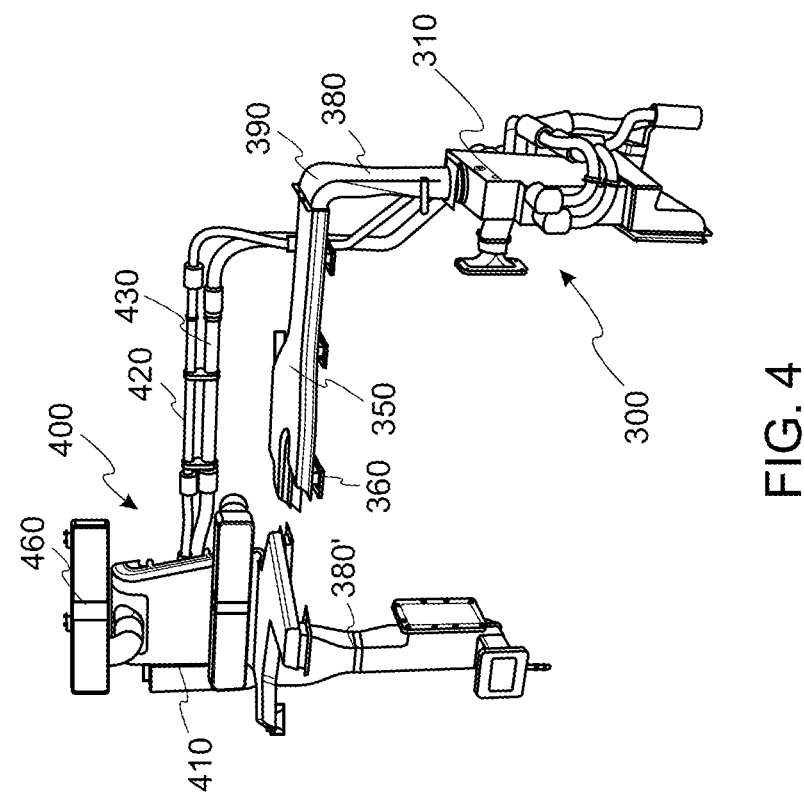
FIG. 4 shows an example of a chilling system according to the disclosure.

An example of the chilling system of this disclosure is shown in FIG. 4, and FIG. 5 shows how this is incorporated into the galley area.

As above, the galley comprises a lower galley zone 120" and an upper galley zone 140" separated by a work deck 150". The lower galley zone 120" has a number of rectangular galley compartments 10", 20", 30", 40" arranged side-by-side and fitted into the curved interior 700 of the aircraft fuselage. Each compartment has a bottom wall 11, a top wall 12, a first side wall 13, a second opposite side wall 14 and a back wall 15. The front of the compartment is open to receive one or more galley trolleys as described above. The upper galley zone 140" is also divided into rectangular compartments. The number and relative sizes of compartments in the galley may vary from aircraft to aircraft or by location within the aircraft.

Because the galley is arranged within a curved interior 700 of the aircraft, a space 60' will be defined between a side wall 414 of the outermost galley compartment 40" and the aircraft interior 700.

In the example shown, a first chilling system 300 has a chiller 310 or heat exchanger which operates similar to the chiller of the known design but is configured to be located in an elongate space at the side of a galley compartment 40'. Preferably, this space 60' is space that is usually wasted space between the galley and the aircraft fuselage created due to the mismatch between the angular contours of the galley and the curved contours of the fuselage. Coolant fluid is provided to and removed from the chiller 310 via fluid pipes 320, 330. Any air return duct 370 is provided extending from the side space into the compartment. The system includes a blower duct 350 having vents 360 through which chilled air from the chiller 310 is blown to cool the galley compartments. The blower duct 350 extends at substantially 90 degrees from the side location of the chiller 310 such that the blower duct and vents extend across the top of the compartments. A conduit 380 is provided between the chiller 310 and the blower duct 370 to convey and diffuse the cooled air from the chiller 310 through a bend 390 of e.g. 90 degrees and to the blower duct 370. Depending on the size and number of compartments, the blower duct may extend across several compartments and a conduit 380, 380' may be provided at each end of the blower duct 270, each conduit also providing the return port opening into the compartment sides.

In addition, in the example shown, a second chiller system 400 may be provided in the upper galley zone at the back of the upper zone compartments. This system 400 is similar to the known system described above that is located in the upper galley zone and includes a chiller 410 having a blower duct 450 with air vents 460 and a return duct 470 all located in a plane at the back of the upper compartments. The location of this system 400 at the back of the compartments is not a problem for upper compartments since, as mentioned above, the full depth of these compartments (or the full depth available for these compartments due to the depth of the lower compartments) is not used for galley equipment. The second chiller system may also supply cold air to the lower galley compartments via a duct 480.

In the design shown, the fluid is provided to and returned from the second chiller 410 via pipes 420, 430 which may be connected to the fluid ducts 320, 330 of the first system 300 via e.g. a T-section.

By providing the blower duct 350 along the tops of the compartments, it will be necessary to provide space for this component e.g. by taking some space at the bottom of the upper zone compartments. The blower duct is, however, a relatively low profile part, and the need to slightly raise the bottom surfaces of the upper zone compartments is a minor disadvantage that is outweighed by the space savings resulting from the other features of the new architecture.

It should be noted that in other examples, the upper zone chiller system 400 may be omitted.

In the example shown in FIGS. 4 and 5, chilled air is blown into the top of the compartments and return air is sucked out from the bottom of the compartments. Although it is always necessary that air is blown in and return air is sucked out, it is also possible that the locations of the blower duct and return duct may be reversed as shown, for example, in the example of FIG. 6A where air A is blown out at the bottom of the compartments and return air R is sucked out from the top.

The type of chiller is also shown by way of example only and other types of chiller system may be provided that can be located in available space above and/or at the side of the galley compartments thus making use of existing available space in the galley area to house the chilling system. Such space may be typically used for miscellaneous storage and/or plumbing system provisions but can be redeployed for the chiller system either instead of or together with the storage/plumbing systems.

By locating the chillers of the chilling system in existing available space in or around the galley, galley trolleys and equipment can be accommodated in a smaller galley or more galley equipment can be accommodated without having to increase the galley dimensions. A smaller galley means that more space may be available for e.g. more stowage space, further cabin furnishing, more seat rows or more leg room for passengers.

What is claimed is:

1. A chiller assembly for a galley defined by straight outer side walls, a top extending from one side to the other and a bottom extending from one side to the other, the galley having one or more rectangular galley compartments therein, each defined by a back wall, a floor, a top wall and two opposing side walls, the chiller assembly comprising a chiller system comprising a heat exchanger configured to be located, in use, in a space adjacent an outer side wall of a galley external to the galley, the space being formed, in use, between a galley outer side wall and a rounded inner surface of a fuselage in which the galley is, in use, located, and a blower duct connected to receive chilled air from the heat exchanger, the blower duct arranged to extend adjacent and across, in the direction from one side wall to the other, the top wall or the floor of one or more compartment, the blower duct having vents to blow chilled air into the compartment via the top wall or the floor, the chiller system further comprising a return duct arranged adjacent and across, in the direction from one outer side wall to the other, the other of the floor or the top wall of the one or more compartment to suck air from the one or more compartment and return it to the heat exchanger, wherein the blower duct is connected to the heat exchanger via a conduit defined by a bend between the heat exchanger and the blower duct.

2. The chiller assembly of claim 1, wherein the blower duct extends adjacent the top wall and blows air from the top of the one or more compartment and the return duct sucks air from the bottom of the one or more compartment.

3. The chiller assembly of claim 1, wherein the blower duct extends adjacent the floor of the one or more compartment and blows air from the bottom of the compartment and the return duct suck air from the top of the one or more compartment.

4. The chiller assembly of claim 1, further comprising a second chiller system comprising a second heat exchanger, a second blower duct and a second return duct.

5. The chiller assembly of claim 1, wherein the blower duct is connected, at an end opposite the end connected to the heat exchanger, to a conduit connected to the return duct.

6. The chiller assembly of claim 4, wherein the first chiller system is configured to be located, in use, in a space adjacent the side of a lower compartment in a galley and the second chiller system is configured to be located adjacent the back wall of an upper compartment of the galley.

7. The chiller assembly of claim 1, where the blower duct is configured to extend adjacent the top wall of multiple adjacent compartments.

8. A galley defined by straight outer sides, a top extending from one side to the other and a bottom extending from one side to the other, the galley having one or more rectangular galley compartments therein, each defined by a back wall, a floor, a top wall, and two opposing side walls, and the chiller assembly as claimed in claim 4, the heat exchanger located adjacent and external to an outer side wall of the galley.

9. The galley of claim 8, comprising a plurality of lower compartments arranged side-by-side and a plurality of upper compartments arranged above the lower compartments, and a work deck between the lower and the upper compartments.

10. The galley of claim 9, wherein the blower duct extends along the work deck.

11. The galley of claim 8, wherein the second chiller system is located adjacent the back wall of one of the upper compartments.

12. The galley of claim 8, wherein the side wall of an end compartment of the one or more compartments is located adjacent a non-straight inner surface of an aircraft, the space being defined between the side wall and the non-straight inner surface.

13. An aircraft comprising the galley as claimed in claim 8.

* * * * *